Inventor
F. C. Spahn
By Arthur H. Sturges
Attorney

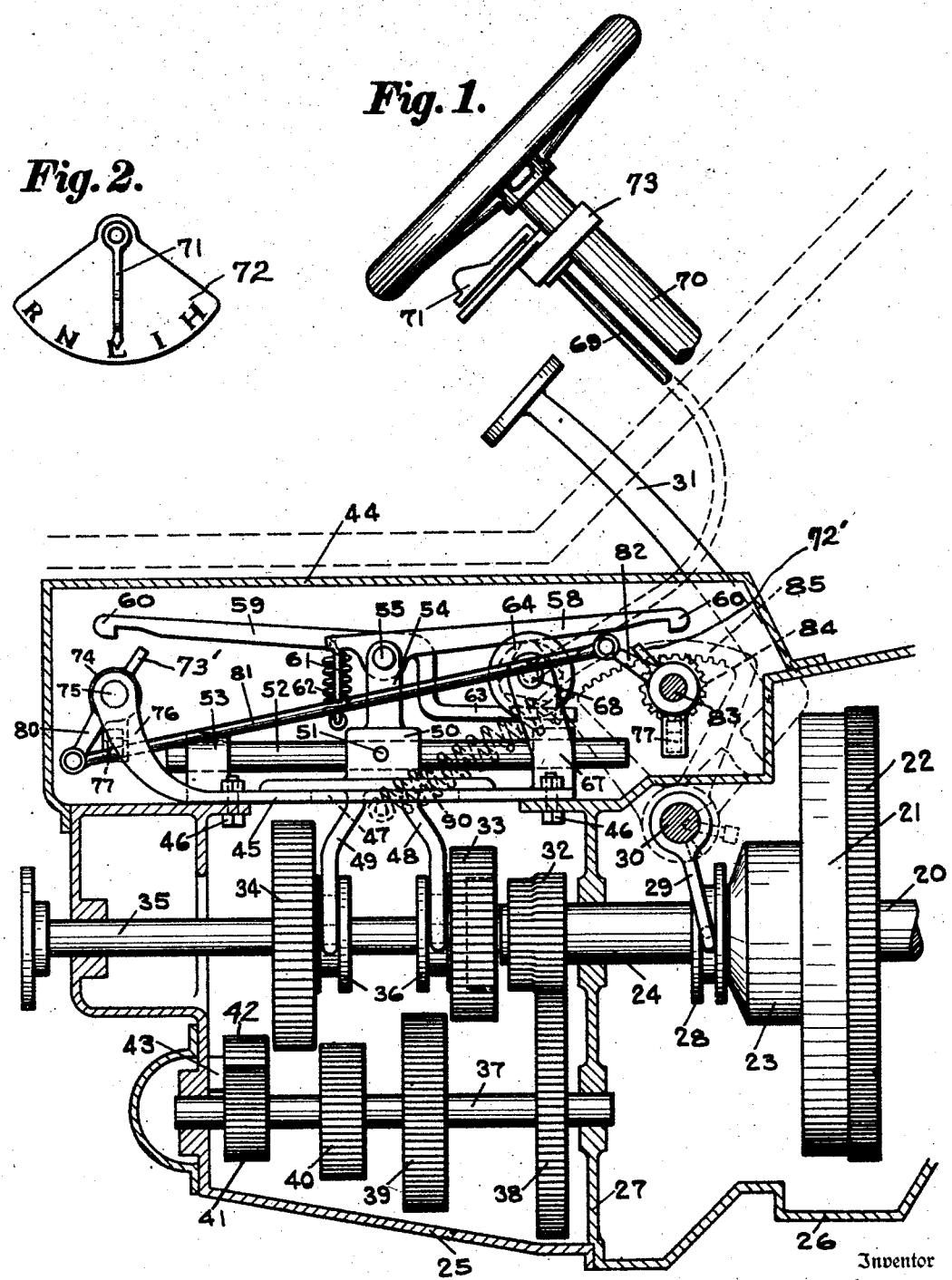

May 21, 1929.  F. C. SPAHN  1,714,194
AUTOMATIC GEAR SHIFT
Filed Oct. 29, 1928   3 Sheets-Sheet 3
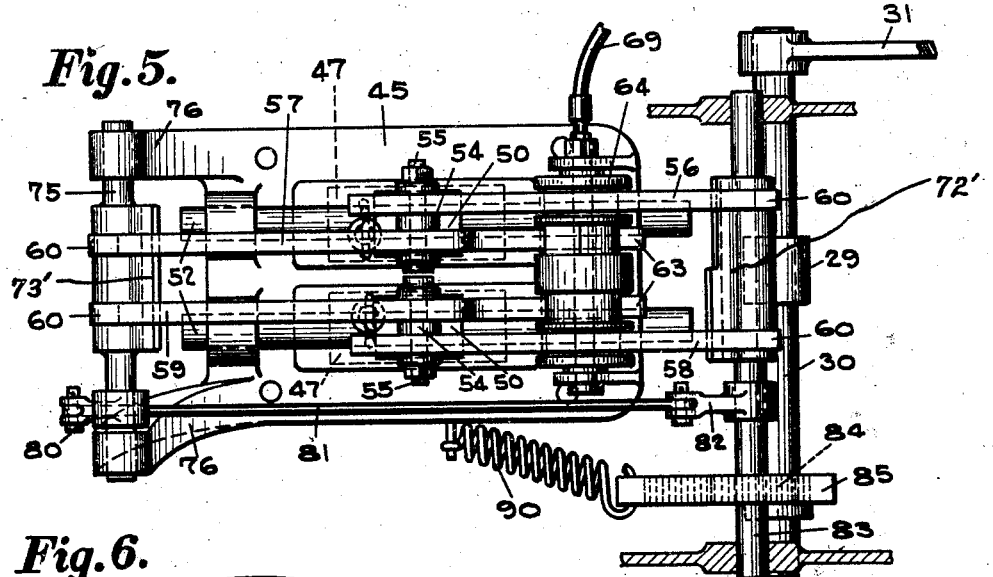
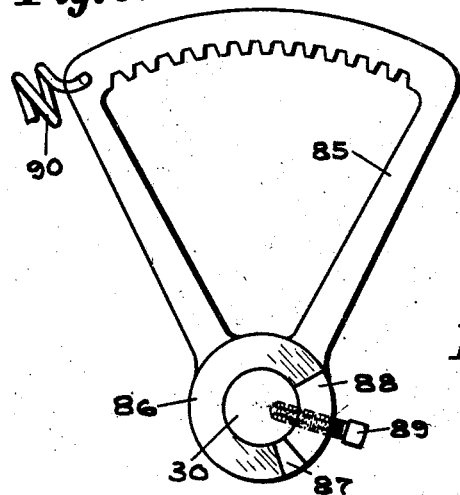
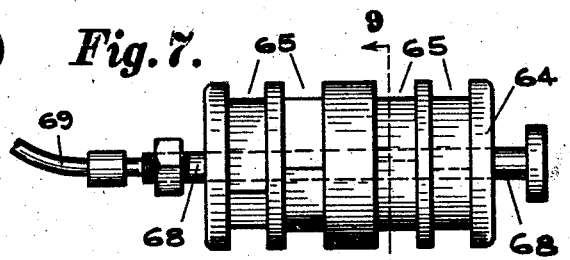
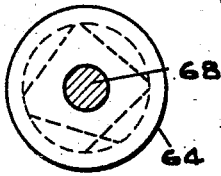
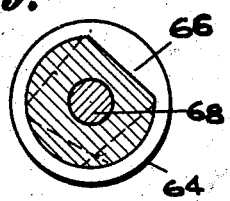
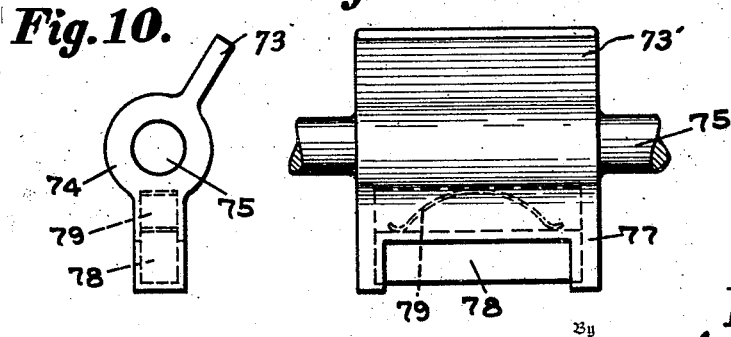
Inventor
F.C.Spahn
By Arthur H. Sturges,
Attorney Patented May 21, 1929.

1,714,194

UNITED STATES PATENT OFFICE.

FRED C. SPAHN, OF SCHLESWIG, IOWA.

AUTOMATIC GEAR SHIFT.

Application filed October 29, 1928. Serial No. 315,865.

The present invention relates to automatic means for shifting the change speed gearing in an automobile power transmission mechanism.

An object of the present invention is to provide automatic means of this character which is under the control of the clutch pedal, and wherein is eliminated the hand lever at present employed for shifting the gearing.

Another object of the invention is to provide a mechanism wherein the gearing mechanism will at all times be shifted into a neutral position before a subsequent adjustment of the gearing may be made, the operation being automatic and not dependent upon the skill or memory of the operator.

A still further object of the invention is to provide a device of this character which is relatively simple in construction, comprises but relatively few parts, which may be economically manufactured, and which may be readily installed or applied to the standard change speed gearing mechanism at present used. The invention also aims to provide certain improvements which relate to the construction shown in applicant's prior Patent Number 1,672,698.

It is a primary object of this invention to eliminate confusion caused during shifting of the gears of a selective gear transmission mechanism of an automobile, and to provide an indicator and a selector which will be visible to the operator at all times for selecting and setting the mechanism so as to change the speed as desired only upon the operation of the clutch pedal.

The above, and various other objects and advantages of this invention will be brought out in and understood from the following detailed description of the present preferred embodiment, the same being illustrated in the accompanying drawings, wherein:

Figure 1 is a longitudinal section taken through the casing of a change speed gearing mechanism and adjacent parts, and showing the automatic gear shifting mechanism of this invention applied thereto.

Figure 2 is a detail plan view of the combined selector and indicator used.

Figure 5 is a top plan view of the transmission mechanism having the automatic devices of this invention applied thereto.

Figure 6 is a side elevation, enlarged, of the actuating sector which is operated through the clutch pedal.

Figure 7 is a detail side elevation of the selector cam employed.

Figure 8 is an end elevation of the same.

Figure 9 is a transverse section through the selector cam taken on the line 9—9 of Figure 7, and looking in the direction of the arrow.

Figure 10 is a detail side elevation of the combined gear shifting dog and the neutral setting dog, and Figure 11 is a face view of the same.

Figure 3:
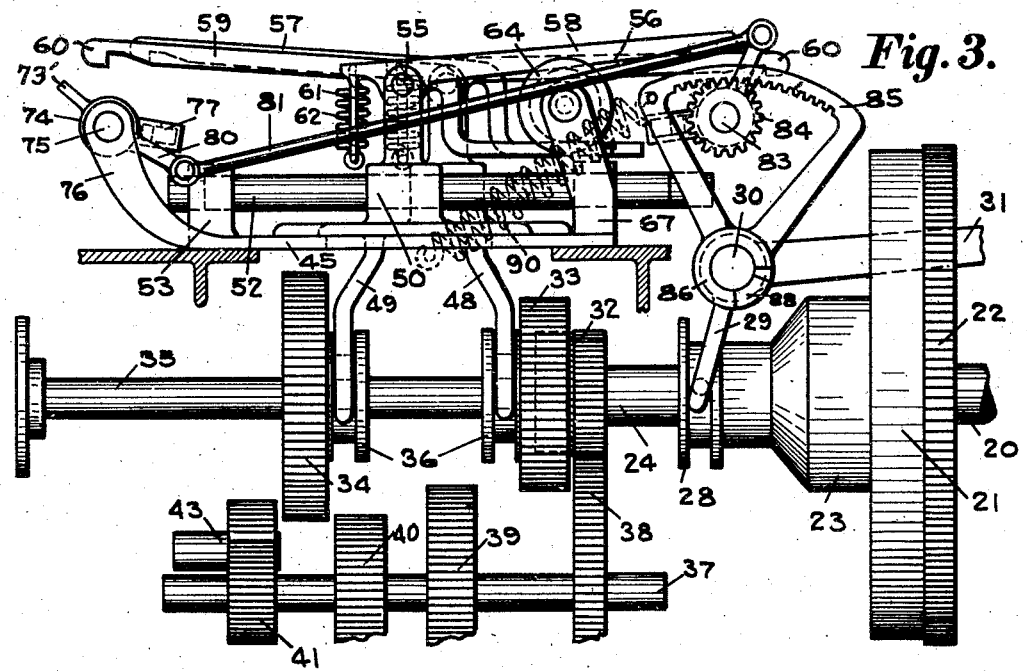
Figure 3 is a side elevation of the change speed gear mechanism showing the improvements applied thereto, the parts being adjusted in high speed position.

Referring now to the drawings for a more particular description of the invention, and wherein like numerals of reference designate corresponding parts throughout the several views, 20 designates the drive shaft or crank shaft of an engine upon which is mounted a fly wheel 21 having the usual starter reinforcements, and which cooperates with a movable clutch member 23 for coupling the drive shaft 24 which extends through the transmission casing 25. The fly wheel 21 and adjacent parts are shown as mounted in a clutch housing 26, which may be a part of the transmission casing 25, but which is preferably separated therefrom by a partition 27 which provides a support for bearings for the various shafts.

The shiftable clutch element 23 is provided with the usual collar 28, with which engages a fork 29 mounted on a transfer shaft 30 to which the clutch pedal 31 is secured. The clutch pedal 31, shaft 30 and fork 29 are of the usual type, and are disposed in the usual position for operation by the foot of the operator when releasing the clutch. The change speed gear mechanism may be of the usual type as shown, and wherein the drive shaft 24 is provided with a small gear 32, an intermediate gear 33, and a large gear 34. The gears 33 and 34 are keyed for longitudinal and independent sliding movement upon the rear section 35 of the drive shaft, and each gear 33 and 34, is provided with a peripherally grooved collar 36 by means of which the gears may be independently shifted.

The transmission casing 25 is also provided with a counter shaft 37 which is disposed in parallel relation with respect to the drive shaft 24 and its section 35, and which has fixed thereon near its forward end a large gear wheel 38, which meshes at all times with the small gear wheel 32 on the drive shaft 24. Fixed upon the counter shaft 37 and spaced from the large gear 38 is an intermediate gear 39 adapted at times to mesh with the gear 33 of the drive shaft section 35. A small gear 40 is also fixed upon the counter shaft 37 in spaced relation to the gear 39, and is adapted at times to mesh with the gear 34 on the drive shaft section 35. Reversed gears 41 and 42 are also mounted in the casing 25, the same being relatively small and the gear 41 being fixed upon the rear end portion of the counter shaft 37 and meshing at all times with the small gear 42 which is mounted upon a sub-shaft or pin 43, mounted on the rear wall of the casing 25. The small gear 42 is adapted to mesh at times with the shiftable gear 34 on the drive shaft section 35.

The automatic gear shifting mechanism of this invention is adapted to be applied to this transmission mechanism, and the major portions of the automatic mechanism may be housed within a casing 44, which is suitably mounted upon the top of the transmission casing 25. The top of the transmission casing 25 is open in the usual manner, and in lieu of the ordinary closure plates and mechanism carried thereby, the present invention provides a supporting plate 45 which is secured by bolts 46 or the like to the top of the transmission casing and over the opening therein. The plate 45 is provided with two longitudinal slots 47 downwardly through which project forks 48 and 49 which engage the collars 36 of the gears 33 and 34. The forks 48 and 49 each have a hollow head 50 detachably mounted by means of a pin 51 upon a longitudinally extending guide rod 52. The guide rods 52 are independently mounted in guides 53 which rise from the opposite end portions of the plate 45 and which hold the fork and their heads in alignment with the respective slots 47. Each head 50 is provided with an upstanding lug 54 upon the upper end of which is mounted a pair of latches that will be hereinafter specifically pointed out.

The fork 48 is the intermediate and high speed fork, and the lug 54 thereof is provided with a transverse pin 55 upon which are pivotally mounted the high speed latch 56 and the intermediate speed latch 57, the latches extending forwardly and rearwardly from the pin 55. The fork 49 controls the low speed and the reverse speed, and the lug 54 thereof carries upon its pin 55 the low speed latch 58 and the reversing latch 59. The latches are all disposed in parallel relation and are provided with downwardly directed hooks 60, the shoulders of which face inwardly toward one another. The inner ends or heels of the forwardly extending latches are provided with depending arms 61 which have their lower ends curved latterly beneath the adjacent rear latches and which are connected to the lower ends of springs 62. The upper ends of the springs 62 are connected to the adjacent portions of the rear latches so that the springs 62 urge the latches downwardly towards the plate 45. There is a spring 62 for each pair of the latches of each head 50.

The rear latches 57 and 59 are each provided with a downwardly offset and forwardly extending heel portion 63, and the heel portions 63 are not only spaced apart transversely of the device but also with respect to the forward latches 56 and 58. The springs 62 thus urge the heel portions 63 upwardly and the forward latches downwardly, and for holding the latches in proper position and selectively operating the same, a selector cam, such as shown in Figures 7, 8, and 9, is employed and is positioned between the forward latches 56 and 58 and the heels 63 of the rear latches. This selector cam is indicated generally at 64 and is provided with peripheral grooves 65, one for each forward latch 56 and 58, and one for each heel 63 of the rear latches. The bottom wall of each groove 65 is provided at one side with a depressed or cam portion 66 in the form of a flat side adapted to permit the movement of the registry latch or heel portion inwardly towards the axis of the cam, and these cam portions 66 are angularly spaced about the selector cam 64 so that the latches may be lowered not only one at a time, but by the rotation of the cam the desired latch may be lowered.

The selector cam 64 may be turned in any suitable manner, and by any suitable mechanism. In the present instance, the cam 64 is mounted in a pair of bracket arms 67 which extend upwardly from the plate 45, and the cam is provided with a shaft 68 mounted to turn in the brackets 67.

One end of the shaft 68 is disclosed as connected to a flexible shaft 69 which may be carried upwardly in the vehicle for easy access of the operator, and which, as shown in Figure 1, may extend upwardly of the steering column 70 and be provided upon its upper end with a radially swinging arm 71 suitably shaped for grasping by the fingers to swing the arm 71 in opposite directions, and which is preferably upon its free end with a pointer or indicator adapted to traverse an indicator 72. The indicator 72 may be in the form of a sector plate secured about the upper end of the shaft 69 by means of a bracket 73 or the like secured to the steering column 70. The indicator 72 may be provided along its marginal portion with suitable indicia indicating the various positions of the cam 64, Figure 2 showing the indicia as indicating reverse by the letter "R", neutral by the letter "N", low speed by the letter "L", intermediate speed by the letter "I", and high speed by the letter "H". Spaced beneath the forward latches 56 and 58, and beneath the hooks 60 thereof, is a forward shifting dog 72', and beneath the hooks 60 of the rear latches 57 and 59 is disposed a rear shifting dog 73'. Each shifting dog may be made of one or more parts and, as shown in Figures 10 and 11, may be in the form of a single web which extends transversely beneath the latches.

In Figures 10 and 11, the shifting dog is shown in the position at the rear end of the mechanism, but it will be noted that the dogs 72' and 73' are of similar construction, the positions of the same being reversed so that the dogs extend upwardly and towards each other at a slight angle. The shifting dog 73' is mounted upon a collar or sleeve 74 fixed to a shaft 75 pivotally mounted in ears 76 which extend upwardly from the plate 45. Each of the shifting dogs, such as the dog 73' as shown in Figures 10 and 11, is provided with a depending neutral setting dog 77 which is recessed at its lower edge portion and provided with a shiftable contact piece 78 normally urged downwardly by a spring 79 for engagement with the adjacent ends of the shifting rods 32. The neutral setting dogs 77 are of sufficient length to engage and slide the rods 52 to neutral position and to escape past the adjacent ends of the rods so as to leave them in neutral position and admit of the continued swinging of the shifting dog 73'. The shaft 75 is provided at one end with an arm 80 to which is pivotally connected one end of a connecting rod 81 which extends forwardly and has pivotal connection with a second arm 82 mounted on a shaft 83 which may have bearing near its opposite ends in the casing 44.

The shaft 83 is provided near one end with a pinion 84 which projects into and intermeshes with the internal teeth of an actuating sector 85. It is noted that the arms 80 and 82 extend in opposite directions, the arm 80 extending downwardly and rearwardly while the arm 82 extends upwardly and rearwardly so that the connecting rod 81 extends above and below the axes of the shafts 75 and 83. Thus, the shifting dogs 72' and 73' are moved toward and from each other, or in opposite directions. The actuating sector 85 is provided with a hub portion 86 mounted to turn upon the clutch pedal shaft 30, and may be held from axial movement on the shaft in any suitable manner. The hub 86, at one side, is provided with a circumferential recess 87 into which is adapted to fit a motion take-up slot 88 which is of less length than the recess 87 and which may be secured to the shaft 30 by a set screw 89 or the like. The actuating sector 85 is held rearwardly in a normal position of rest by a spring 90 secured at one end to the sector 85 and at its other end to the plate 45, or to any other suitable fixed support. The block 88 and recess 87 are of such relative dimensions that the clutch pedal 31 is adapted to be moved through substantially one-third of its operating stroke before the block 88 engages the end of the recess 87 and transmits the motion of the shaft 30 to the actuating sector 85. The purpose of this lost motion is to insure sufficient movement of the clutch pedal 31 for releasing the clutch member 23 before the shifting mechanism is set in motion. It will be noted, particularly from Figure 1, that the shafts 75 and 83 are so positioned beneath the hooks 60 of the latches that the shifting dogs 72' and 73' must necessarily reach a substantially vertical position coaxially with the shafts 75 and 83 before the shifting dogs engage the hooks 60. During the initial swinging movement of the shifting dogs 72' and 73', the neutral setting dogs 77 are brought into engagement with the ends of the shifting rods 52 and move the same to neutral position before the shifting dogs 72' and 73' are brought into play.

The operation of the improved automatic gear shifting mechanism is as follows:

Assuming that the parts are in neutral position, such as shown in Figure 1, when it is desired to change the speed transmission mechanism into high gear, such as shown in Figure 3, it is first necessary to swing the indicator arm 71 on the steering column 70 until the pointer of the arm is brought opposite to the indicia letter "H". This adjustment of the arm 71 turns the selector cam 64 in such a manner that the cam faces or depression 66 are turned so that one of them which registers with the high speed latch 56 is brought beneath the latch and the spring 62 which is connected to the heel of the latch swings the latch downwardly toward the shaft 83. This operation does not actuate the gear shifting mechanism however, and the gears can not be shifted until the operator first throws out the clutch by pressing the clutch pedal 31 forwardly and downwardly sufficiently to withdraw the clutch element 23, and disconnect the power shaft 20 from the transmission mechanism. As soon as the clutch is released, the block 88 engages the hub 86 and carries the actuating sector 85 with the clutch, the sector 85 swinging forwardly against the tension of the spring 90 and with the clutch pedal 31. The actuating sector 85 now turns the pinion 84, rotates the shafts 83 and 75 and swings the shifting dogs 72' and 73' forwardly and backwardly, respectively. During this movement, the neutral setting dogs 77 strike the adjacent ends of the rods 52, if the latter are not in neutral position, so as to correctly position all of the parts. The selector cam 64 holds all of the latches in raised position with the exception of the one latch 56 which has been released on account of the registration of the cam or depression 66 therewith. In this case, the forward shifting dog 72' is brought into engagement with the shoulder 60 of the latch 56 so as to couple the latch to the shifting dog and to thus couple the fork 48 to the mechanism. The continued movement of the clutch pedal 31 turns the shaft 83 and slides the fork 48 forwardly with its gear 33 so as to interlock the gear 33 with the gear 32 on the drive shaft 24. This position of the part is shown to advantage in Figure 3 wherein the mechanism is in high gear and the clutch pedal is about to be released so as to interlock the transmission mechanism with the drive shaft 20 of the motor.

Figure 4:
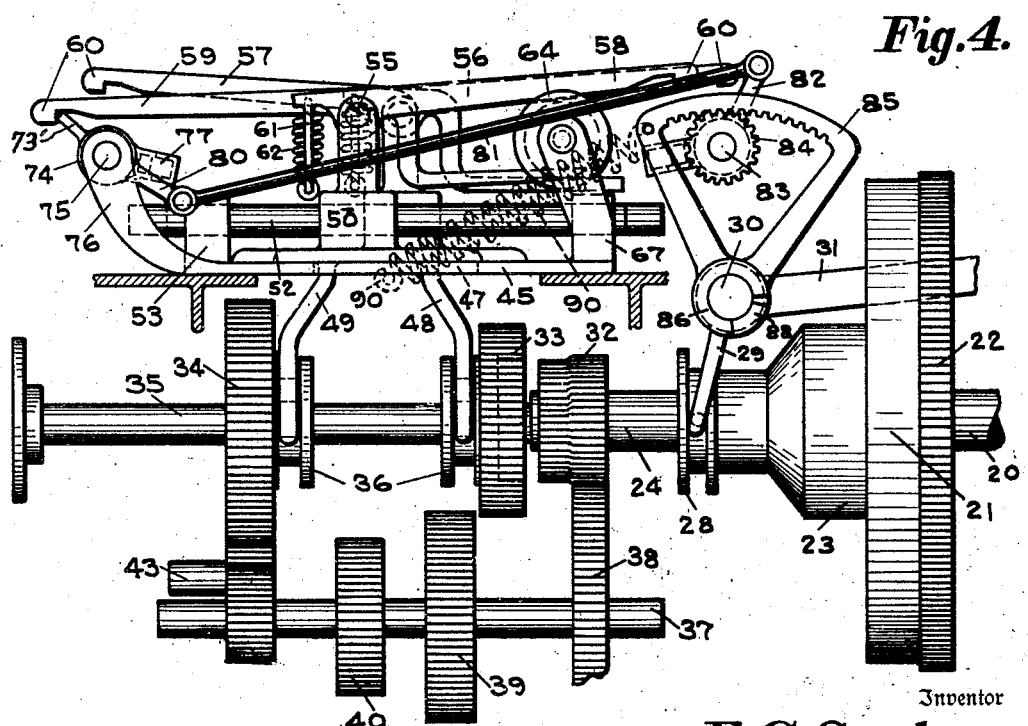
Figure 4 is a similar view, showing the parts adjusted for reversed position.

As soon as the clutch pedal 31 is released, the spring 90 draws the actuating sector 85 rearwardly, turning the shafts 75 and 83 into their normal position of rest so that all of the parts are in normal position excepting the fork 48 and the parts immediately connected thereto. When it is desired to adjust the gears into neutral position, it is only necessary to adjust the indicator arm 71 into position opposite the indicia letter "N" which causes the selector cam 64 to hold all of the latches in raised position out of the paths of the dogs 72' and 73'. When the clutch 31 is now released, the shafts 83 and 75 are so turned as to swing the shifting dogs 72' and 73', the latter being operated merely for the purpose of swinging the neutral setting dogs 77 so that the latter may engage the adjacent ends of the shifting rods 52 and move them back into neutral position, such as shown in Figure 1. The clutch may now be released by the operator so that the transmission will not be in gear. The rear shifting dog 73' operates in a similar manner through the connecting rod 81 so as to shift the gearing into the position shown in Figure 4 so that the transmission of the power through the automobile is in a reversed direction. In this instance, the cam 64 is so turned as to release the latch 59 and permit it to drop into the path of the dog 73' so that as the latter moves rearwardly the fork 49 with its gear 34 is moved into intermeshing relation with the reversed gear 42.

The arm 71 is utilized for setting the mechanism to the selected gear ratio while the mechanism is not actually operated or set until after the clutch has been released, and after each operation the mechanism insures the neutral positioning of all of the parts of the apparatus and the gearing so that there can be no interlocking of the parts or jamming such as may be the case when a hand control shifting lever is used. It is thus seen that the mechanism is entirely automatic and at the same time is checked in its operation by a predetermined releasing of the clutch. The spring pressed plate 78 of the neutral setting dogs 77 are adapted to retract and snap past the ends of the guide rods 52 after the latter have been shifted into position beneath the dogs 77, and prior to the returning of the dogs to their normal positions of rest. The plate 78, however, can not be retracted when the dogs 77 are swung upwardly from their positions of rest so that the shifting dogs 72' and 73' can not operate any part of the mechanism until all of the mechanism is returned to a strictly neutral position, such as shown in Figure 1.

It is of course understood that various changes and modifications may be made in the details of construction and design of the above specifically described parts of this invention without departing from the spirit thereof, such changes and modifications being restricted only by the scope of the following claims.

What is claimed is:

1. In combination with the transmission gearing and clutch of an automobile, a plate for attachment above the gearing mechanism, a pair of slidable members mounted on the plate and having forks for engaging the gears of the transmission mechanism, a pair of oppositely extending latches carried by and above each member, a shifting dog beyond each end of the slidable members arranged for interlocking engagement with said latches, lost motion operating means for connection with the clutch to operate the shifting dogs and move the same in opposite directions, and a selecting device connected to said latches adapted to release the same one at a time for engagement with said shifting dogs to slide said members in the selected direction.

2. In combination with transmission gearing and a clutch, a pair of slidable members having forks for engaging the shiftable gears of the gearing, a pair of oppositely extending latches carried by said members, shifting dogs arranged beneath said latches, a lost motion connection between said dogs and the clutch for swinging the dogs upon the predetermined movement of the clutch, a selector member supporting said latches out of the path of said dogs, said selector member having releasing portions thereon, means for adjusting said member for moving the releasing portion into registry with the selected latch whereby said latch is adapted to move into the path of the adjacent dog, and means for returning the parts to normal position to adjust the transmission gearing into neutral position.

3. In combination with transmission gearing and a clutch therefor, a pair of independently slidable members connected to the sliding gears of the transmission, a pair of oppositely extending latches mounted on each member, a shifting dog pivotally mounted beneath the free ends of said latches, means for holding the latches in raised position out of the path of said dogs, means for selectively releasing the latches one at a time for position in the path of the adjacent dog, and a lost motion clutch connection between the dogs and the clutch for operating the dogs subsequent to the release of the clutch and shifting the selected member in the selected position.

4. In combination with a change speed gearing, and a clutch therefor, a pair of shiftable members connected to the shifting elements of the gearing, a pair of latches extending in opposite direction from each of said members, operating dogs pivotally mounted beneath said latches, lost motion means between the latches, dogs and the clutch for actuating the dogs, a selector cam supporting said latches out of the path of said dogs and provided with depressed portions adapted for registration with the latches one at a time for releasing the latches for movement into the path of the adjacent dog, and manual indicating means connected to said selector cam for turning the same to the desired position to release the selected latch.

5. In combination with transmission gearing and a clutch, a plate for attachment to the transmission gearing, a pair of members slidably mounted on the plate and having connection with the respective shiftable elements of the transmission gearing, a pair of latches pivotally mounted on each member and extending in opposite directions therefrom, means for normally urging said latches downwardly, a selector cam interposed between the latches for supporting the same in raised position, interconnected swinging dogs arranged between the free ends of the oppositely extending latches and normally out of the path thereof, means for selectively releasing the latches for movement into the path of said members, and a lost motion clutch connection between said members and the clutch.

6. In combination with transmission gearing and a clutch, slidable rods disposed above the gearing and having connection to shift the shiftable gears of the transmission, a pair of latches secured at intermediate portions of each rod to move with the rods but having a pivoted shifting dog located beyond each end of the rods for engaging and shifting the latches when depressed, means coupled to the clutch for conjointly operating the shifting dogs, and selecting means operatively engaging the latches to control the depressing movement of the latches into the path of said dogs.

7. In combination with transmission gearing and a clutch, slidable rods disposed above the gearing and having connection to shift the shiftable gears of the transmission, a pair of latches secured at intermediate portions of each rod to move with the rods but having a pivotal movement with respect to the rods, a pivotal shifting dog located beyond each end of the rods for engaging and shifting the latches when depressed, means coupled to the clutch for conjointly operating the shifting dogs, selecting means operatively engaging the latches to control the depressing movement of the latches into the path of said dogs, and a neutral setting dog operatively associated with each shifting dog for engaging the opposite ends of the rods to move same to neutral position.

In testimony whereof, I have affixed my signature.

FRED C. SPAHN.